United States Patent
Zybala et al.

(10) Patent No.: US 10,775,807 B2
(45) Date of Patent: Sep. 15, 2020

(54) SYSTEM FOR GUIDANCE OF A ROBOT THROUGH A PASSENGER CABIN OF AN AIRCRAFT

(71) Applicant: Airbus Operations GmbH, Hamburg (DE)

(72) Inventors: Andre Zybala, Hanstedt (DE); Guillermo Carmona-Puga, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 258 days.

(21) Appl. No.: 16/021,504

(22) Filed: Jun. 28, 2018

(65) Prior Publication Data
US 2019/0004540 A1     Jan. 3, 2019

(30) Foreign Application Priority Data
Jun. 28, 2017     (DE) .................... 20 2017 103 847 U

(51) Int. Cl.
*G05D 1/03*     (2006.01)
*H02J 50/10*    (2016.01)
(Continued)

(52) U.S. Cl.
CPC ........... *G05D 1/03* (2013.01); *B64D 11/0007* (2013.01); *G05D 1/0022* (2013.01);
(Continued)

(58) Field of Classification Search
CPC ...... G05D 1/03; G05D 1/0265; G05D 1/0022; B64D 11/0007; H02J 50/40; H02J 50/10; H02J 2310/44; B60N 3/10; B60N 3/18
See application file for complete search history.

(56) References Cited

U.S. PATENT DOCUMENTS 3,657,678 A * 4/1972 Schwenden ............. H01F 29/14
                                                           336/160
3,740,746 A *  6/1973 Dureau .................... G06C 7/02
                                                            341/32
(Continued)

FOREIGN PATENT DOCUMENTS

CN      105415377 A      3/2016
CN      205166945 U      4/2016
(Continued)

OTHER PUBLICATIONS

German Serach Report for German Application No. 202017103847.5 dated Feb. 28, 2018.

*Primary Examiner* — Behrang Badii
*Assistant Examiner* — Jalal C Coduroglu
(74) *Attorney, Agent, or Firm* — Jenkins, Wilson, Taylor & Hunt, P.A.

(57) ABSTRACT

A system for guidance of a robot through a passenger cabin of an aircraft on at least a part of a defined system of paths including a robot, having at least one secondary coil, a field of coils including N primary coils being integrated in the floor of the passenger cabin of an aircraft, the arrangement of the primary coils defining a system of paths of the robot, and a control system for positioning of and energy provision to the robot including a command unit for sending instructions to the robot, so that the robot can reach a specific position of the defined system of paths.

18 Claims, 1 Drawing Sheet

(51) Int. Cl.
  *H02J 50/40* (2016.01)
  *B64D 11/00* (2006.01)
  *G05D 1/02* (2020.01)
  *G05D 1/00* (2006.01)

(52) U.S. Cl.
  CPC ............ *G05D 1/0265* (2013.01); *H02J 50/10* (2016.02); *H02J 50/40* (2016.02)

(56) References Cited

U.S. PATENT DOCUMENTS

| | | | | |
|---|---|---|---|---|
| 4,134,065 A * | 1/1979 | Bauer | ................ | G01D 5/2258 324/207.18 |
| 5,496,000 A * | 3/1996 | Mueller | ............. | B64D 11/0007 104/88.01 |
| 5,504,427 A * | 4/1996 | Cooper | .................... | G01B 7/30 324/207.13 |
| 6,490,539 B1 * | 12/2002 | Dickson | ............... | A01B 69/008 180/168 |
| 6,686,951 B1 * | 2/2004 | Dickson | ............... | A01B 69/008 348/120 |
| 8,515,578 B2 * | 8/2013 | Chiappetta | ........... | G05D 1/0272 180/167 |
| 8,972,052 B2 * | 3/2015 | Chiappetta | ............. | B60L 53/38 700/245 |
| 9,008,835 B2 * | 4/2015 | Dubrovsky | .......... | G05B 19/409 700/245 |
| 9,300,079 B2 * | 3/2016 | Radeke | ................. | H01R 13/60 |
| 9,319,108 B2 * | 4/2016 | Bauer | ..................... | H02J 50/80 |
| 2002/0186520 A1 * | 12/2002 | Eyssa | ..................... | H02K 99/20 361/141 |
| 2003/0094949 A1 * | 5/2003 | Kimmlingen | ........ | G01R 33/385 324/318 |
| 2004/0184622 A1 * | 9/2004 | Ohashi | .................. | H04R 9/046 381/111 |
| 2005/0243144 A1 * | 11/2005 | Dean, Jr. | .................... | B01J 2/02 347/74 |
| 2006/0049822 A1 * | 3/2006 | Watson | ..................... | G01P 1/08 324/174 |
| 2006/0163950 A1 * | 7/2006 | Harris | ..................... | H02M 1/10 307/80 |
| 2007/0013328 A1 * | 1/2007 | Shemm | ................ | H02K 41/031 318/135 |
| 2008/0183349 A1 * | 7/2008 | Abramson | ........... | A01D 34/008 701/23 |
| 2008/0214092 A1 * | 9/2008 | Kordonski | ............ | G01N 27/76 451/36 |
| 2010/0106223 A1 * | 4/2010 | Grevious | .............. | A61N 1/3787 607/60 |
| 2010/0259349 A1 * | 10/2010 | Li | ....................... | H01L 23/5227 336/200 |
| 2010/0285747 A1 * | 11/2010 | Bauer | ..................... | H02J 5/005 455/41.1 |
| 2011/0295423 A1 * | 12/2011 | Anderson | ............ | G05D 1/0088 700/248 |
| 2011/0295424 A1 * | 12/2011 | Johnson | ............... | G05D 1/0274 700/248 |
| 2013/0056583 A1 * | 3/2013 | Schliwa | ............. | B64D 11/0007 244/118.5 |
| 2013/0110281 A1 * | 5/2013 | Jones | ....................... | G05D 1/00 700/228 |
| 2014/0339364 A1 * | 11/2014 | Ehlers | .................... | B64D 11/00 244/118.6 |
| 2015/0014481 A1 * | 1/2015 | Vandewall | ......... | B64D 11/0007 244/118.5 |
| 2016/0109835 A1 * | 4/2016 | Kurata | ............... | G03G 15/2046 399/67 |
| 2017/0168486 A1 * | 6/2017 | Tommy | .................. | G05D 1/021 |
| 2017/0282724 A1 * | 10/2017 | Krammer | ............ | H01F 27/2823 |
| 2018/0321682 A1 * | 11/2018 | Matsumoto | .......... | G05D 1/0055 |
| 2019/0189343 A1 * | 6/2019 | Eder | .................... | H01F 27/2823 |
| 2019/0196475 A1 * | 6/2019 | Vandewall | ............. | B64D 11/00 |

FOREIGN PATENT DOCUMENTS

| | | |
|---|---|---|
| CN | 205290978 U | 6/2016 |
| DE | 4308144 C1 | 10/1994 |
| DE | 69501205 T2 | 7/1998 |
| DE | 102009054700 A1 | 6/2011 |
| DE | 102012008540 A1 | 10/2013 |
| WO | WO 2011/132202 A1 | 10/2011 |
| WO | WO 2015/049058 A1 | 4/2015 |

\* cited by examiner

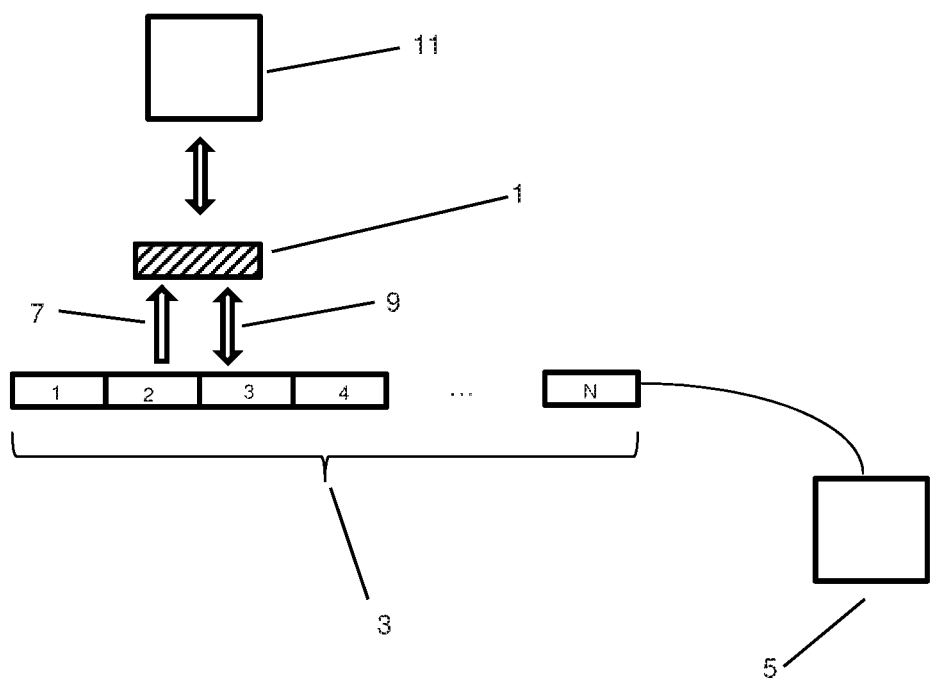

SYSTEM FOR GUIDANCE OF A ROBOT THROUGH A PASSENGER CABIN OF AN AIRCRAFT

CROSS-REFERENCE TO RELATED APPLICATION

This application claims priority to German patent application DE 20 2017 103 847.5 filed Jun. 28, 2017, the entire disclosure of which is incorporated by reference herein.

TECHNICAL FIELD

The disclosure herein concerns a system for guidance of a robot through a passenger cabin of an aircraft on at least a part of a defined system of paths comprising a robot, having at least one secondary coil, a field of coils comprising a plurality of N primary coils being integrated in the floor of the passenger cabin of an aircraft, the arrangement of the primary coils defining a system of paths of the robot, and a control system for positioning of and energy provision to the robot comprising a command unit for sending instructions to the robot, so that the robot can reach a specific position of the defined system of paths.

The disclosure herein also concerns a robot having a radio-based transmitting/receiving system for contactlessly receiving energy and contactlessly receiving and/or transmitting data, comprising at least one secondary coil with a radio-based transmitting/receiving system, a motor, a processor for actuating the at least one motor to perform a desired movement of the robot in an aircraft cabin, and an energy supply unit for adapting the energy to energy values required by the robot.

The application also concerns an aircraft having a system for guidance of a robot through a passenger cabin of an aircraft.

BACKGROUND

US 2010/0285747 A1 discloses a cabin system, according to which energy and data can be contactlessly transmitted by coils from the cabin floor to objects arranged above the latter, for example cargo containers, galleys, on-board toilets, entertainment systems or other electrical loads above the floor.

CN 205166945 U and CN 105415377 A also disclose the practice of using a human-like robot as a replacement for a flight attendant for the purpose of serving food in an aircraft cabin. CN 205290978 U also discloses a robot for serving meals.

US 2015/0014481 A1 and WO 2011/132202 A1 describe supply trolleys guided on rails. WO 2015049058 A1 discloses a method for serving passengers with the aid of a transport apparatus arranged inside or below the cabin floor.

A disadvantage of the prior art is that the robots must be provided with a battery in order to perform the tasks intended for them. This is time-consuming and is disadvantageous from an ecological point of view. A guidance system in the form of a rail is in turn visually disruptive or is even a tripping hazard.

SUMMARY

Therefore, an object of the disclosure herein is to provide a system for guidance of a robot through a passenger cabin of an aircraft and a robot which overcome the disadvantages mentioned above.

The system according to the disclosure herein for guidance of a robot through a passenger cabin of an aircraft on at least a part of a defined system of paths has a robot, having at least one secondary coil, a field of coils comprising a plurality of N primary coils being integrated in the floor of the passenger cabin of an aircraft, the arrangement of the primary coils defining a system of paths of the robot, and a control system for positioning of and energy provision to the robot. The control system comprises a command unit for sending instructions to the robot, so that the robot can reach a specific position of the defined system of paths, wherein those primary coils which correspond to the specific position of the system of paths can be dynamically activated, with the result that a magnetic field for guiding the robot is generated. In this case, the at least one secondary coil has a radio-based transmitting/receiving system, and each of the N primary coils in turn has a radio-based transmitting/receiving system. When the at least one secondary coil is at least partially above one of the primary coils, energy and/or data can be bidirectionally transmitted to and from the at least one secondary coil of the robot in a contactless manner via at least one respective primary coil by the radio-based transmitting/receiving system.

An advantage is that energy and data can be simultaneously provided in this manner for the robot to be guided on a particular, that is to say predefined, system of paths. This makes it possible to dispense with equipping the robot with a heavy battery or rechargeable battery. The robot can therefore act in a sufficiently autonomous manner: there is a constant energy supply for the robot along the predefined system of paths, with the result that inactivity caused by charging operations is avoided. It is naturally nevertheless conceivable for the robot to also comprise a lightweight rechargeable battery or battery in order to allow it to move, for example in the event of a power failure, into a position in which it does not disturb the aircraft crew or the passengers. As a result of the low weight of the robot, it is also possible, in the event of a power failure, for the robot to be manually moved by the aircraft crew.

The system according to the disclosure herein for guidance may additionally enable direct data communication, wherein it is communicated, on the one hand, where the robot is situated and, on the other hand, where its next target position is intended to be. There is no need to install additional communication means for communication between the robot and the control system, "the cabin" as it were, which has an advantageous effect on the weight balance of the aircraft.

The system of paths can be oriented along aisles in a passenger aircraft and on the basis of seating rows. Parts can lead into the galley or other special areas, for example. The primary coils integrated in the floor can be arranged under the carpet which is usually laid in a passenger cabin. However, they may also be integrally formed with the floor or may be printed onto the floor.

The presented solution uses an active magnetic field which is deliberately generated by the primary coils, also called underfloor coils. The arrangement of these primary coils defines the desired system of paths which is intended to be followed by the robot. The primary coils are dynamically activated and therefore generate a magnetic field which can be used to guide and position the robot. The robot in turn has an installed primary coil on its side facing the cabin floor in the operating mode. According to the principle known from US 2010/0285747 A1, for example, energy can be transmitted from the primary coils to the robot or to its at least one secondary coil by induction.

Both the primary coils (underfloor coils) and the secondary coil of the robot each have a radio-based transmitting/receiving system so that bidirectional communication between the coils and therefore between the control system and the robot is possible by radio. This communication or this flow of information can in turn be used, on the one hand, for communication between the robot and other cabin systems and, on the other hand, to accurately position the robot in the aircraft cabin, as long as the robot can identify the coil(s) activated under it and it is possible to calculate the position of the robot in the aircraft cabin since the coils are individually arranged at known positions in the floor of the aircraft cabin. The robot must be guided or positioned at least with seating row accuracy. The communication by the radio-based transmitting/receiving systems can naturally also be used to send instructions to the robot, for example "start", "stop", "start the service", "pick up trash in a particular seating row" or "come back" etc.

The command unit of the system according to the disclosure herein for guidance of a robot is responsible for sending instructions to the robot via the communication connection provided by the field of coils, that is to say via the individual primary coils with their transmitting and receiving units. Such instructions may analogously be, for example:

Go to a particular position, in order to direct the robot to a desired position ("GOTO # POS")

Stop, in order to interrupt the movement of the robot ("STOP"),

Continue, in order to continue a movement which has been stopped ("CONTINUE"),

Park, in order to send the robot to its parked position ("PARK") or

Status, in order to obtain the current status of the robot ("STATUS").

The system according to the disclosure herein for guidance of a robot also comprises at least one interface for connecting at least one aircraft-associated system to the control system, with the result that bidirectional data transmission can be carried out between one or more aircraft-associated systems and the control system. An aircraft-associated system is preferably a cabin management panel or a flight attendant panel (FAP). This enables simple communication between the crew of an aircraft and the robot and between further aircraft systems. It is conceivable, for example, for the service of the robot to be temporarily suspended on the basis of announced turbulence. Another preferred aircraft-associated system is the cabin data backbone. This data line makes it possible for the system according to the disclosure herein for guidance of a robot to be connected to any other device in the cabin, for example personal electronic devices (PEDs) or crew devices. In this manner, a passenger can directly interact with the robot without a crew member being involved. For example, the passenger can request the robot to dispose of trash. In addition, the cabin intercommunication data system (CIDS), the inflight entertainment (IFE) or the galley may be aircraft-associated systems.

The field of coils on the whole enables constant communication with the aid of the plurality of primary coils in order to activate or deactivate energy transmission, for example.

The system for guidance of a robot according to the disclosure herein preferably has a navigation map which can represent a position of the robot with respect to objects in the passenger cabin of an aircraft with the aid of an algorithm taking into account a size of the N primary coils and dimensions of the aircraft cabin. These objects may be, for example, seating rows, the galley or other monuments (for example toilets) or else doors. In this manner, the crew can quickly discern where the robot is currently situated even in a very large aircraft on the basis of a known fixed orientation point.

In this case, at least some of the primary coils comprise an identification for positioning the robot with seating row accuracy.

The energy transmission of the system according to the disclosure herein for guidance of a robot by a primary coil is 60 W to 400 W, for example. Preferably, and in particular in order to save energy, the system according to the disclosure herein is designed such that only the primary coil at which the secondary coil of the robot is situated is switched on. All other primary coils which are not covered are either switched off or have only a small measuring current applied to them in order to be able to detect a robot or its secondary coil above them.

The induction-based data transfer in the system according to the disclosure herein for guidance of a robot between the at least one secondary coil and at least one of the N primary coils may have a rate of approximately 115 kilobits per second (kbit/s), for example.

The radio-based data transfer in the system according to the disclosure herein for guidance of a robot between the at least one secondary coil and at least one of the N primary coils may be approximately 400 megabits per second (Mbit/s), for example.

It goes without saying that the stated values for the data transfer rates should be understood, in particular, as meaning an order of magnitude.

The robot according to the disclosure herein and having a radio-based transmitting/receiving system for contactlessly receiving energy and contactlessly receiving and/or transmitting data comprises at least one secondary coil with a radio-based transmitting/receiving system, a motor, a processor for actuating the at least one motor to perform a desired movement of the robot in an aircraft cabin, and also an energy supply unit for adapting the energy to energy values required by the robot.

In a particularly preferred manner, the robot has two secondary coils each with a radio-based transmitting/receiving system, also comprising a dual-coil interface which is designed to receive energy from a field of coils having a plurality of N primary coils, wherein the two radio-based transmitting/receiving systems are redundantly designed.

This dual-coil interface is redundantly designed since the two secondary coils of the robot each provide the same functions. This makes it possible to position the robot in an improved manner: although it is fundamentally possible to determine the position of the robot on the basis of a single secondary coil, the transmitting/receiving system is preferably designed in such a manner that at least two primary coils of the above-mentioned field of coils according to the disclosure herein are covered by it. This makes it possible to position the robot in a very precise manner, with the result that passengers can interact with it.

The processor according to the disclosure herein in the robot is responsible, on the one hand, for informing the robot of its status which is intended to be adopted by the robot. On the other hand, it sends instructions to the motor or possibly to a plurality of motors of the robot so that the robot performs the desired movement. This then makes it possible to interact with a person (passenger or crew). The processor may also comprise a navigation map, on the basis of which it is possible for the robot to identify a desired position and to proceed there.

The energy supply unit for adapting the energy to energy values required by the robot can be individually matched to the requirements of the electronic components of the robot.

As already mentioned above, in another preferred embodiment, the robot also comprises a rechargeable battery or a battery in order to allow the robot to move, for example in the event of a power failure, to a suitable parked position in which it does not hinder the aircraft crew or the passengers. As a result of the low weight of the robot, it is also possible, in the event of a power failure, for the robot to be manually moved by the aircraft crew.

The robot preferably also has an interface for interacting with persons. This interface may be in the form of an input field (for example in the form of a touchpad), for example. However, a voice input would also be conceivable.

In another embodiment according to the disclosure herein, the robot also comprises an interface for interacting with a passenger supply unit (PSU). A passenger-specific request can be communicated to the robot with seating row accuracy or possibly even seat accuracy via a PSU.

In a particularly preferred manner, the robot is in the form of a cabin trolley. Such a cabin trolley may hold drinks or meals, for example, or else may be a type of moving garbage can which proceeds to a particular seating row in response to a passenger request.

So that the robot can reliably reach its respective target position or can also evade small obstacles, for example, it preferably has omnidirectional wheels (so-called omni wheels). In this case, a plurality of rollers are accommodated in a wheel and only those rollers which allow the robot to move in the desired direction are specifically driven.

The disclosure herein also concerns an aircraft having an above-described system for guidance of a robot through a passenger cabin of an aircraft. Such a system may either be installed from the outset as standard equipment when first delivering an aircraft (linefit) or may be subsequently installed at a later date (retrofit).

In another preferred embodiment, the aircraft having a system for guidance of a robot through a passenger cabin of an aircraft also has a robot as described above.

BRIEF DESCRIPTION OF THE DRAWING

The disclosure herein is explained below with reference to the example drawing.

FIG. 1 shows a schematic view of a system according to the disclosure herein for guidance of a robot through a passenger cabin of an aircraft on at least a part of a defined system of paths.

DETAILED DESCRIPTION

In this case, the robot preferably comprises two secondary coils 1. The spatial arrangement of the field of coils 3 having the plurality of N primary coils integrated in the floor of the passenger cabin of an aircraft defines the system of paths of the robot in the present case. A control system 5 for positioning and supplying energy 7 to the robot ensures that instructions are sent to the robot via a command unit, so that the robot can reach a specific position of the defined system of paths. For this purpose, data 9 can be transmitted to the robot, but also, in the opposite direction, from the robot to the control system 5.

The system for guidance of a robot according to the disclosure herein preferably has a navigation map which can represent the respective position of the robot with respect to objects in the passenger cabin of an aircraft with the aid of an algorithm 11 taking into account the spatial dimensions, that is to say the size of the N primary coils, and taking into account the dimensions of the aircraft cabin. These objects may be, for example, seating rows, the galley or other monuments (for example toilets) or else doors. In this manner, the crew can quickly discern where the robot is currently situated even in a very large aircraft on the basis of a known fixed orientation point. The control system can in turn be connected to other aircraft-associated systems, for example the cabin intercommunication data system (CIDS), the inflight entertainment (IFE) or the galley.

Advantages of the disclosure herein are, on the one hand, the positioning with seating row accuracy and, on the other hand, the navigation which follows predefined routes and therefore makes it possible to correctly guide a robot. In addition, the contactless energy transmission ensures that energy can be continuously supplied even without batteries. The installed data communication also prevents the use of unnecessary additional communication connections. A robot according to the disclosure herein is always available without having to use waiting time until the rechargeable battery of the robot is charged again. In addition, the system according to the disclosure herein can be installed in a virtually invisible manner, that is to say it does not interfere with the overall impression of the aircraft cabin designed in an airline-specific manner.

It should finally be mentioned that the system according to the disclosure herein and the robot according to the disclosure herein can be used not only to serve passengers: it is conceivable, in particular, for both to also be able to have an opportunity even when manufacturing an aircraft cabin.

The subject matter disclosed herein can be implemented in software in combination with hardware and/or firmware. For example, the subject matter described herein can be implemented in software executed by a processor or processing unit. In one exemplary implementation, the subject matter described herein can be implemented using a computer readable medium having stored thereon computer executable instructions that when executed by a processor of a computer control the computer to perform steps. Exemplary computer readable mediums suitable for implementing the subject matter described herein include non-transitory devices, such as disk memory devices, chip memory devices, programmable logic devices, and application specific integrated circuits. In addition, a computer readable medium that implements the subject matter described herein can be located on a single device or computing platform or can be distributed across multiple devices or computing platforms.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a", "an" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system for guidance of a robot through a passenger cabin of an aircraft on at least a part of a defined system of paths, comprising:
   a robot, having at least one secondary coil;
   a field of coils comprising a plurality of N primary coils being integrated in a floor of the passenger cabin of an aircraft, an arrangement of the primary coils defining a system of paths of the robot; and
   a control system for positioning of and energy provision to the robot comprising:
   a command unit for sending instructions to the robot, so that the robot can reach a specific position of the defined system of paths;
   wherein the primary coils which correspond to the specific position of the system of paths can be dynamically activated, with a result that a magnetic field for guiding the robot is generated,
   wherein the at least one secondary coil has a radio-based transmitting/receiving system, and
   wherein each of the N primary coils has a radio-based transmitting/receiving system, and wherein, when the at least one secondary coil is at least partially above one of the primary coils, energy and/or data can be bidirectionally transmitted to and from the at least one secondary coil of the robot in a contactless manner via at least one respective primary coil by the radio-based transmitting/receiving system.

2. The system for guidance of a robot according to claim 1, further comprising at least one interface for connecting one or more aircraft-associated systems to the control system, with a result that bidirectional data transmission can be carried out between one or more aircraft-associated systems and the control system.

3. The system for guidance of a robot according to claim 1, wherein one or more aircraft-associated systems are a flight attendant panel and/or a cabin data backbone.

4. The system for guidance of a robot according to claim 1, comprising a navigation map which represents a position of the robot with respect to objects in the passenger cabin of an aircraft with aid of an algorithm taking into account a size of the N primary coils and dimensions of the aircraft cabin.

5. The system for guidance of a robot according to claim 1, wherein at least some of the primary coils comprise an identification for positioning the robot with seating row accuracy.

6. The system for guidance of a robot according to claim 1, wherein energy transmission is 60 W to 400 W.

7. The system for guidance of a robot according to claim 1, wherein induction-based data transfer between the at least one secondary coil and at least one of the N primary coils is 115 kbit/s.

8. The system for guidance of a robot according to claim 1, wherein radio-based data transfer between the at least one secondary coil and at least one of the N primary coils is 400 Mbit/s.

9. A robot having a radio-based transmitting/receiving system for contactlessly receiving energy and contactlessly receiving and/or transmitting data, comprising:
   at least one secondary coil with a radio-based transmitting/receiving system;
   a motor;
   a processor for actuating the at least one motor to perform a desired movement of the robot in an aircraft cabin; and
   an energy supply unit for adapting the energy to energy values required by the robot.

10. The robot according to claim 9, wherein the robot comprises two secondary coils each with a radio-based transmitting/receiving system, and further comprising a dual-coil interface to receive energy from a field of coils having a plurality of N primary coils, wherein the radio-based transmitting/receiving systems are redundantly designed.

11. The robot according to claim 9, further comprising a rechargeable battery or a battery.

12. The robot according to claim 9, further comprising an interface for interacting with persons.

13. The robot according to claim 9, further comprising an interface for interacting with a passenger supply unit.

14. The robot according to claim 9, wherein the robot is in a form of a cabin trolley.

15. The robot according to claim 9, wherein the robot has omnidirectional wheels.

16. An aircraft having a system for guidance of a robot through a passenger cabin of an aircraft according to claim 1.

17. An aircraft comprising a system for guidance of a robot through a passenger cabin of an aircraft, the robot having a radio-based transmitting/receiving system for contactlessly receiving energy and contactlessly receiving and/or transmitting data, the robot comprising:
   at least one secondary coil with a radio-based transmitting/receiving system;
   a motor;
   a processor for actuating the at least one motor to perform a desired movement of the robot in an aircraft cabin; and
   an energy supply unit for adapting the energy to energy values required by the robot.

18. The aircraft according to claim 17 wherein the robot is in a form of a cabin trolley.

* * * * *